US005297702A

United States Patent [19]

Crosby et al.

[11] Patent Number: 5,297,702

[45] Date of Patent: Mar. 29, 1994

[54] DEVICE FOR DISPENSING VISCOUS MATERIAL FROM A CONTAINER

[75] Inventors: Dana B. Crosby; Ronald C. Dreyer, both of Cincinnati, Ohio

[73] Assignee: Fibre Glass-Evercoat Company, Inc., Cincinnati, Ohio

[21] Appl. No.: 49,575

[22] Filed: Apr. 19, 1993

[51] Int. Cl.[5] .............................................. G01F 11/00

[52] U.S. Cl. .................................... 222/185; 222/327; 222/391

[58] Field of Search ............... 222/181, 185, 326, 327, 222/387, 391, 559

[56] References Cited

U.S. PATENT DOCUMENTS

| | | | |
|---|---|---|---|
| 367,678 | 8/1887 | Burgess | 222/391 X |
| 514,508 | 2/1894 | Shabley | 222/391 X |
| 1,268,654 | 6/1918 | White et al. | 222/326 |
| 1,761,875 | 6/1930 | Cordell et al. | 222/327 X |
| 1,851,794 | 3/1932 | Wilson | 222/391 X |
| 2,282,727 | 5/1942 | Kasuske | 222/391 |
| 2,561,825 | 7/1951 | Sherbondy | 222/391 X |
| 2,602,571 | 7/1952 | Sherbondy | 222/391 X |
| 2,726,802 | 12/1955 | Jones | 222/391 X |
| 2,815.151 | 12/1957 | Collins | 222/391 X |
| 3,174,653 | 3/1965 | McFachran | 222/391 X |
| 3,381,861 | 5/1968 | Stein | 222/391 X |
| 3,456,849 | 7/1969 | Sjostrand | 222/391 |
| 3,664,508 | 5/1972 | Linder | 222/386 |
| 3,687,339 | 8/1972 | Dessureault | 222/391 X |
| 3,796,355 | 3/1974 | Linder et al. | 222/185 |
| 4,072,254 | 2/1978 | Cox | 222/391 |
| 4,090,639 | 5/1978 | Campbell et al. | 222/391 X |
| 4,231,492 | 11/1980 | Rios | 222/327 X |
| 4,391,389 | 7/1983 | Catalfamo | 222/391 X |
| 4,813,574 | 3/1989 | Hwan | 222/325 |
| 4,978,042 | 12/1990 | Fidler | 222/326 X |

*Primary Examiner*—Andres Kashnikow
*Assistant Examiner*—Anthoula Pomrening
*Attorney, Agent, or Firm*—Killworth, Gottman, Hagan & Schaeff

[57] ABSTRACT

A device for dispensing a viscous material from a container having an outlet on the bottom thereof, including a standing frame with a base capable of supporting the container of viscous material. The device is portable and contains two side members which support a cross member. A drive lever is pivotally mounted to the cross member. As the drive lever is rotated downward, a rectangular actuating member attached thereto contacts a gripping plate which, in turn, locks onto a drive rod. The gripping plate is rectangular in shape with an extended contact surface. The device employs an angular member which serves to maintain the gripping plate in a canted position in order to facilitate contact with the actuating member. The drive rod moves downward, forcing a drive plate attached thereto to move downward against a seal member, thereby creating a reasonably tight seal between the seal member and the inner wall of the container, positioned within the frame. The seal member applies a downward force along the upper surface of the viscous material, causing a portion of the material to be dispensed from an outlet and valve located on the bottom of the container.

14 Claims, 5 Drawing Sheets

DEVICE FOR DISPENSING VISCOUS MATERIAL FROM A CONTAINER

BACKGROUND OF THE INVENTION

The present invention relates to a device for effecting pressure dispensing of certain types of viscous materials from original, closed containers.

Putty used to fill dents in automobile bodies frequently is distributed in original, sealed containers (pails) of three-gallon or five-gallon capacity. Dispensing devices currently available use the application of compressed air to space above putty inside original sealed container in order to dispense the putty. Pressure is maintained continuously with a valve opened when material is required.

This type of pressure dispensing has several disadvantages:

- Pressurizing the vapor of a flammable material should be avoided;
- Moisture from compressed air can contaminate product;
- Pails are not pressure rated, and
- A source of compressed air must be present to operate.

In addition, designs currently available prefer substantial valving which is permanent in nature. Body filler has the tendency to harden with exposure which can be noticed at outlet of permanent valving.

Finally, it should be noted that due to the layout of many workshops and the limited availability of putty containers in any given shop, it is often necessary to move the containers in order to position them in closer proximity to the automobiles being repaired. Several prior art devices used to dispense body putty, however, are not portable.

Therefore, it is seen that there is a need for design improvement, including mechanical force transmission, elimination of potential moisture contamination, elimination of a potentially dangerous pressure vessel, and the portability of the dispensing device. Further, there is a need for a device that replaces the permanent valve.

SUMMARY OF THE INVENTION

A dispensing device according to the present invention which meets this need comprises a standing frame with a base, a pair of side members, and a cross member attached to the side members. The frame is adapted to house a container (filler pail) which contains viscous material. The container is positioned on top of the base of the frame, substantially centered below the cross member. The container has an outlet on the bottom thereof having a removable/breakable seal thereover.

When a part of the dispensing device, the container has positioned within it a seal member, the lower surface of which contacts the viscous material. Above the seal member is a drive plate, the bottom surface of which contacts the upper surface of the seal member. In the preferred embodiment of this invention, a drive plate having a concave shape is used, with the concave surface being in contact with the upper surface of the seal member. As force is applied, the drive plate flattens. This results in a more efficient application of force against the seal member, and also creates a tighter seal between the seal member and the inner wall of the container.

A drive rod is attached to the drive plate and protrudes vertically therefrom through the cross member of the frame, which contains a pair of vertically-aligned apertures. These apertures accommodate the drive rod such that the drive rod is vertically slidable within the cross member and the drive plate is vertically translatable within the container.

At least one gripping plate is positioned within the internal chamber of the cross member. The preferred design contemplates the use of two gripping plates. One skilled in the art, however, will appreciate that any number of gripping plates may be used and that the use of two gripping plates should not be construed as a limitation upon the present invention. The gripping plate contains a bore located in an off-center position through which the drive rod extends. The off-center location of the bore provides the gripping plate with an extended contact surface. In the preferred embodiment, the extended contact surface is rectangular in shape.

A drive lever is pivotally mounted to the cross member. The drive lever has attached thereto an actuating member. When the drive lever is pivoted in a downward direction, the actuating member contacts the extended contact surface of the gripping plate, thereby causing the gripping plate to lock onto the drive rod. As the drive lever is moved farther downward, the drive rod, drive plate, and seal member are translated in a downward direction against the viscous material, thereby resulting in the dispensing of a portion of the viscous material from an outlet located on the bottom surface of the container. The preferred design employs an actuating member having a rectangular shape, such that the actuating member contacts the extended contact surface of the gripping plate along a rectangular contact zone.

In the preferred embodiment of the invention, a slide valve is adapted to attach to the outlet on the container, thereby allowing the user to regulate the amount of viscous material dispensed. The slide valve contains a body portion with an inlet to receive the viscous material from the outlet of the container and an outlet through which the viscous material flows. The slide valve also contains a slide member positioned between the inlet of the body portion and the outlet of the body portion. The slide member is translatable between a first position and a second position, with the first position preventing the viscous material from being dispensed from the container and the second position allowing the viscous material to be dispensed from the container.

Resilient biasing means biases the gripping plate toward the top portion of the cross member. Preferably, the resilient biasing means includes a compression spring positioned within the internal chamber of the cross member, with the spring being coiled around the drive rod and having a first end in contact with the bottom portion of the cross member and a second end in contact with the gripping plate such that the gripping plate is biased toward the top portion of the cross member. When the gripping plate unlocks from the drive rod, the gripping plate is returned to its original position and the drive lever pivots in an upward direction.

In order to facilitate contact between the actuating member and the gripping plate, means are included for positioning the gripping plate such that the actuating member, upon pivoting the drive rod downward, contacts the gripping plate when the gripping plate is biased in an upward position. The positioning means allows the drive rod to be vertically translated within the dispensing device without interference when the gripping plate is biased in an upward position. The preferred embodiment utilizes an angular member to position the gripping plate. The angular member is positioned within the internal chamber of the cross member and has a bore through which the drive rod extends. The angular member is positioned atop the gripping plate and has a surface canted at a predetermined angle such that, when the gripping plate is pressed against the top portion of the cross member by the resilient biasing means, the angular member causes the gripping plate to be canted at the predetermined angle to allow the actuating member to make contact with the gripping plate when the drive lever is pivoted in a downward direction.

Accordingly, it is an object of the present invention to provide a dispensing device in which force is translated efficiently from the operator to the viscous material; to provide a device which is portable; to provide a device which allows a minimal amount of viscous material to be wasted; and to provide a device capable of dispensing material from a three- or five-gallon container.

DETAILED DESCRIPTION OF THE PREFERRED EMBODIMENTS

Figure 1:
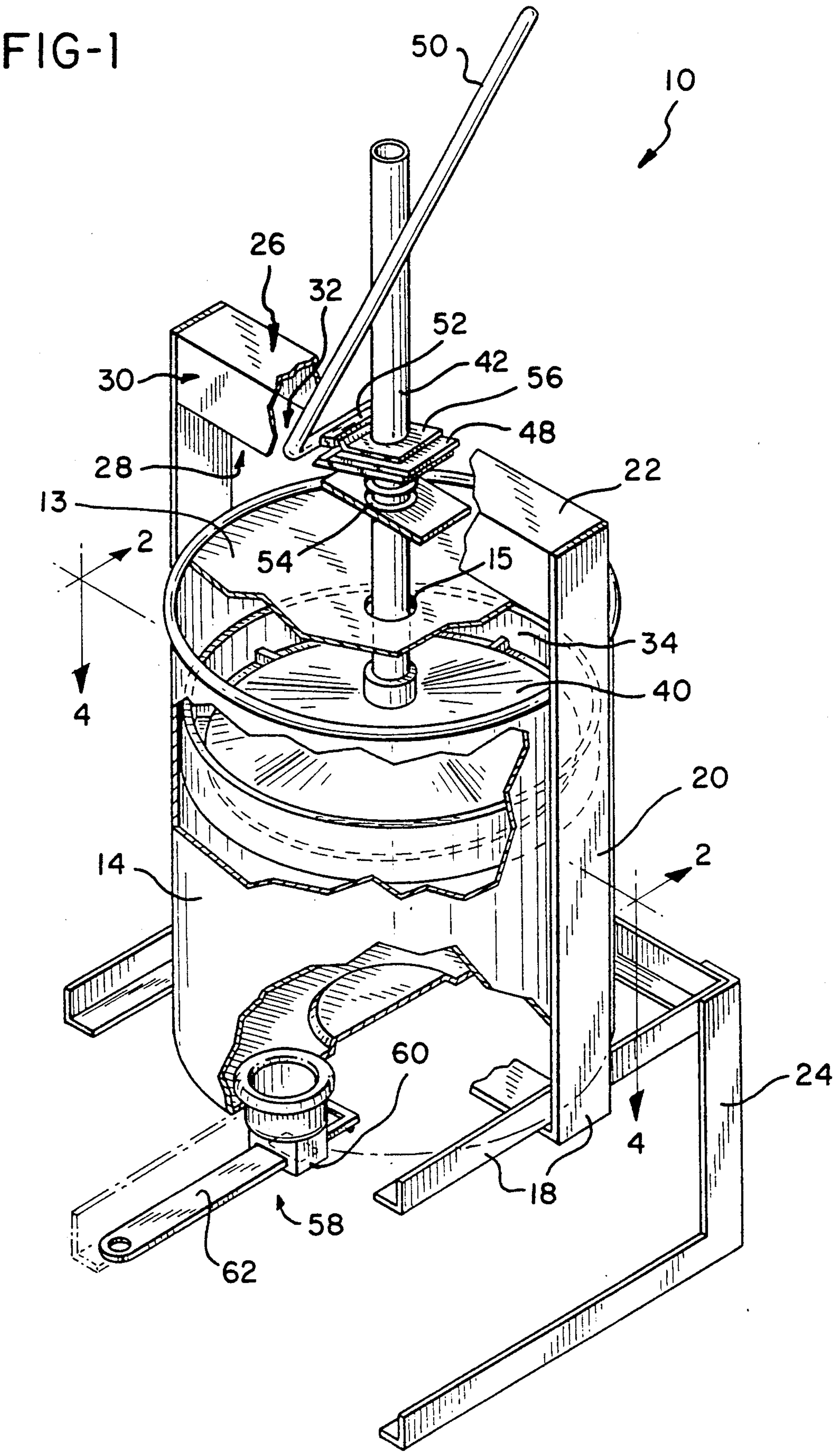
FIG. 1 is a perspective view of the dispensing device including a container of viscous material, partly broken away in order to show the slide valve on the bottom surface of the container and the interrelationship of the drive lever, angular member, gripping plates, compression spring, drive rod and drive plate.
Figure 2:
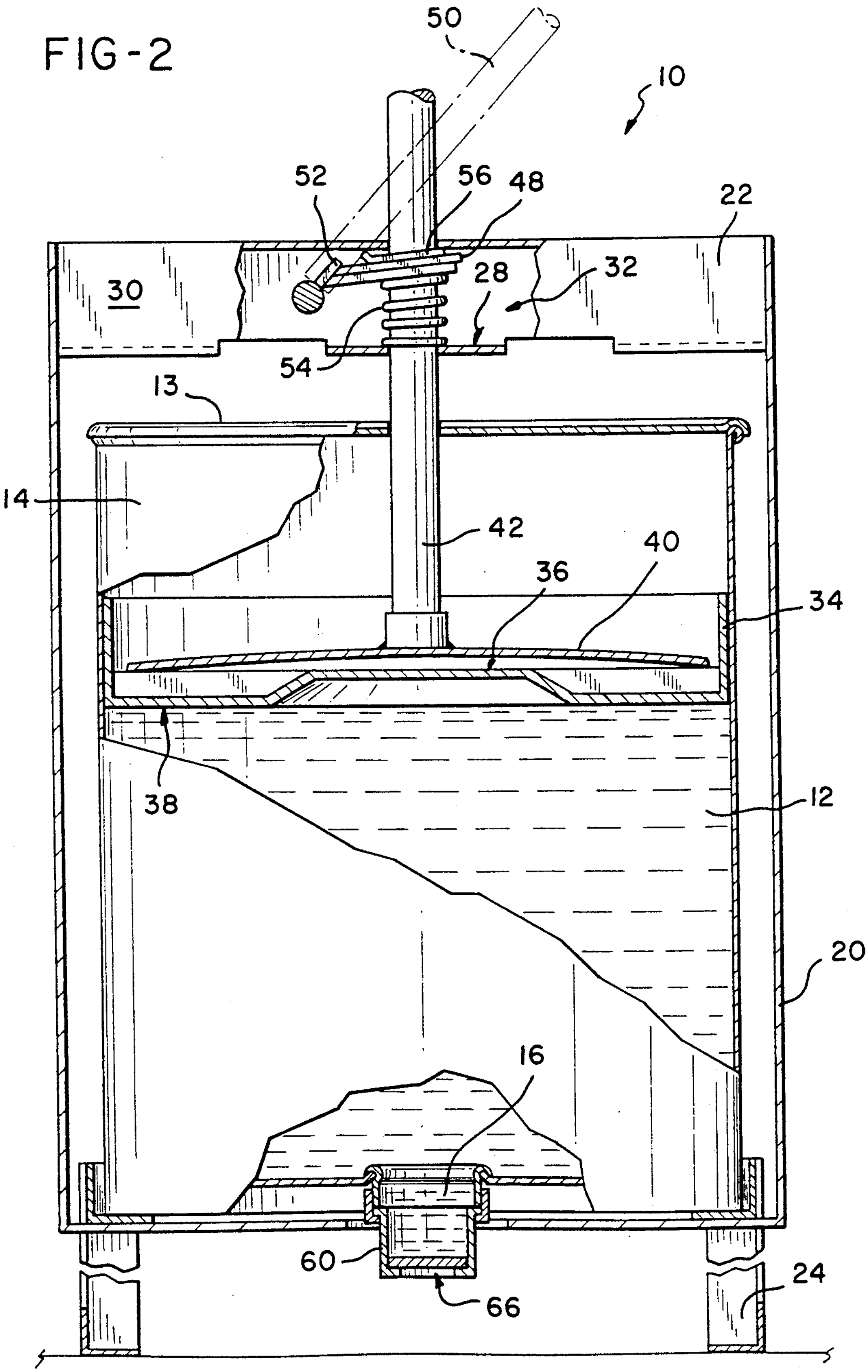
FIG. 2 is an enlarged cross-section of the same, taken along line 2—2 of FIG. 1, showing the drive lever in position for depressing and a container of viscous material to be dispensed.

Reference is made, collectively, to FIGS. 1 and 2, which depict a dispensing device 10 for dispensing a viscous material 12 from a container 14. Container 14 is preferably a three or five gallon filler pail containing a viscous material such as automobile body filler (putty), having a removable lid (not shown) and having an outlet 16 on the bottom thereof having a removable/breakable seal thereover (not shown). FIG. 1 is a perspective view of the device 10, with portions cut away. FIG. 2 is a cross-sectional view, taken along line 2—2 as shown in FIG. 1.

The dispensing device 10 includes a frame 18 with a base 24 which is adapted to support the container 14. The frame 18 possesses a pair of side members 20 attached to base 24, and a cross member 22 that is supported by side members 20 and positioned above container 14 such that container 14 is substantially centered beneath cross member 22. Cross member 22 has a top portion 26, a bottom portion 28, and side portions 30, all of which define internal chamber 32.

Dispensing device 10 further contains a seal member 34 which has an upper surface 36 and a lower surface 38, with lower surface 38 being in contact with viscous material 12 along substantially the entire upper surface of viscous material 12. Drive plate 40 contacts the upper surface of seal member 34, and has attached thereto a drive rod 42. Thus, when the removable lid (not shown) is removed from container 14, the upper surface 36 of seal member 34 is exposed and drive plate 40 is thereafter brought into contact with the entire upper surface 36 of seal member 34. A dust cover 13, which is similar to the removable lid (not shown) but has an opening 15 in the center thereof through which drive rod 42 extends, is available to fit on the container 14 over drive plate 40 and seal member 34. Dust cover 13 further protects the viscous material 12 from contamination.

Drive rod 42 extends vertically through vertically-aligned apertures in cross member 22. The apertures slidably accommodate drive rod 42 such that drive rod 42 and drive plate 40 are vertically translatable within dispensing device 10.

Positioned within internal chamber 32 are gripping plates 48 with bores through which drive rod 42 extends. A drive lever 50 is pivotally mounted to cross member 22. The drive lever 50 has an actuating member 52 attached thereto.

Figure 3:
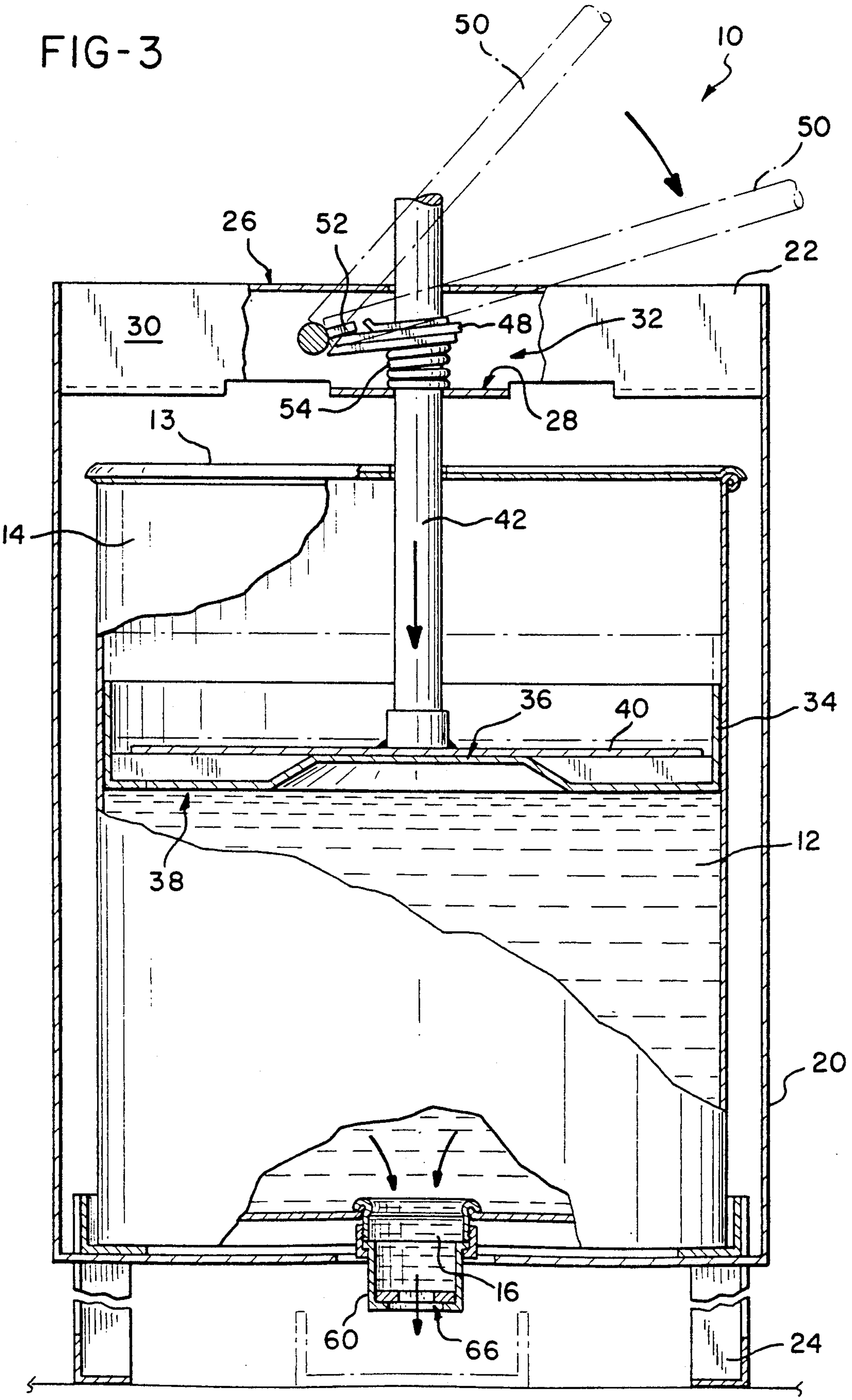
FIG. 3 is nearly identical to FIG. 2, but shows the drive lever in the depressed position, along with the direction of movement of the drive rod and the flow of the viscous material.

Referring now to FIG. 3, actuating member 52 contacts gripping plates 48 when drive lever 50 is pivoted in a downward direction, causing gripping plates 48 to lock onto drive rod 42 and thereby allowing drive lever 50 to forcibly translate drive rod 42, drive plate 40, and seal member 34 in a downward direction against viscous material 12. Upon the application of pressure upon viscous material 12, at least a portion of viscous material 12 is dispensed via outlet 16.

A compression spring 54 is provided for biasing gripping plates 48 toward top portion 26 of cross member 22, such that when gripping plates 48 unlock from drive rod 42, gripping plates 48 are translated along drive rod 42 and pressed against top portion 26, thereby pivoting drive lever 50 in an upward direction.

Angular member 56 is provided for positioning gripping plates 48 when gripping plates 48 are pressed against top portion 26 of cross member 22, such that actuating member 52 of drive lever 50 can be made to contact gripping plates 48 when drive lever 50 is pivoted in a downward direction. Angular member 56 allows drive rod 42 to be vertically translated in dispensing device 10 without interference when gripping plates 48 are pressed against top portion 26.

Figure 4:
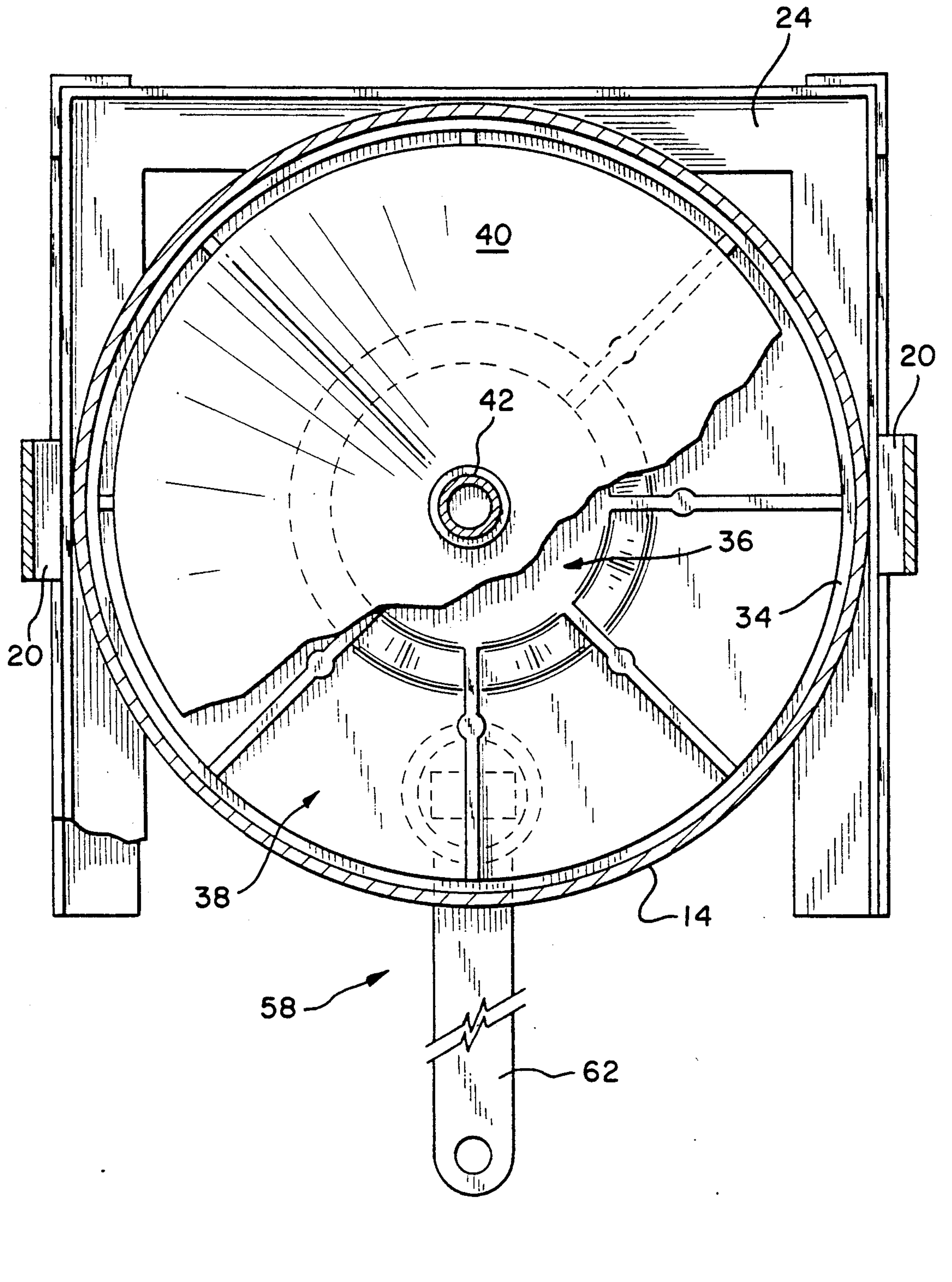
FIG. 4 is an elevational cross-section, taken along line 4—4 of FIG. 1, with the bottom of the container partially cut away, showing the position of the slide valve attached to the outlet on the bottom of the container.

Reference is now made to FIG. 4, which depicts a cross-sectional view from the top of device 10 as taken along line 4—4 of FIG. 1. FIG. 4 shows more clearly the structure of base 24 and the positioning of container 14 with respect thereto.

Figure 5:
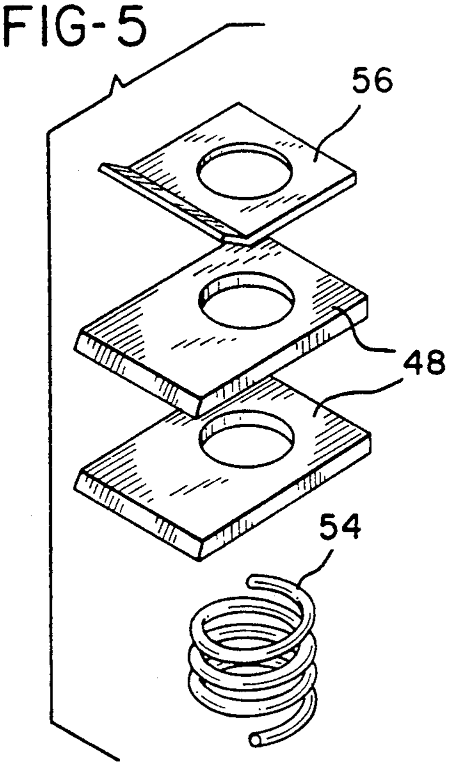
FIG. 5 shows an element of the preferred embodiment in which two gripping plates are used along with resilient biasing means and means for positioning the gripping plates.

Reference is now made to FIG. 5, which depicts the relative shapes and positions of spring 54, gripping plates 48, and angular member 56. Those skilled in the art will appreciate that any number of gripping plates 48 may be used, and that the depiction of two gripping plates 48 should not be considered a limitation of the present invention.

Figure 6:
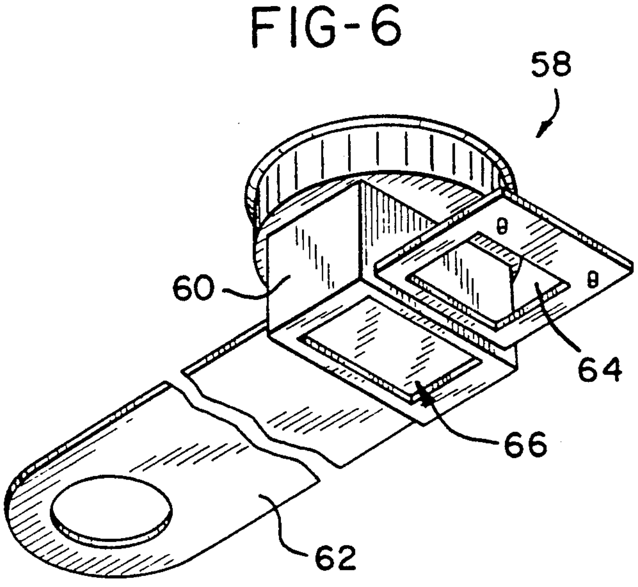
FIG. 6 is a view of the slide valve which is attached to the outlet on the bottom of the container.
Figure 7:
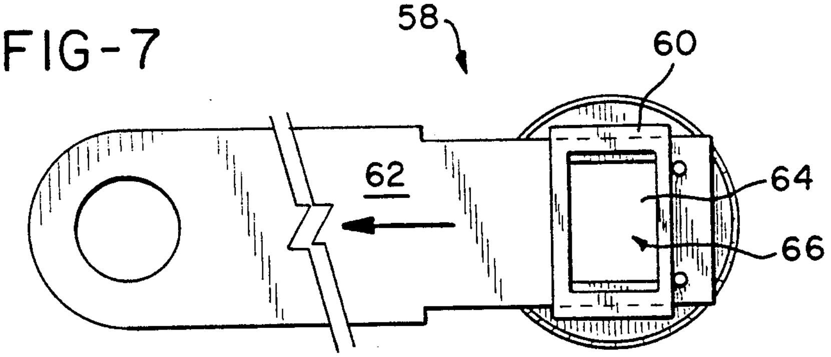
FIG. 7 is a bottom view of the slide valve showing the valve in an open position.
Figure 8:
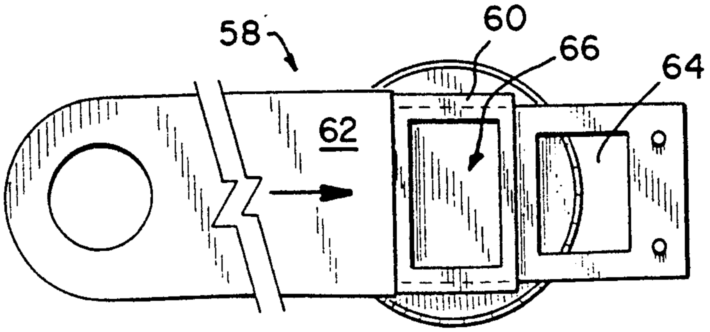
FIG. 8 is a bottom view of the slide valve with the valve in a closed position.

Referring collectively to FIGS. 6-8, the drawings depict slide valve 58. FIG. 6 shows body portion 60 which is adapted to attach to outlet 16 of the container 14, after the removable seal (not shown) over outlet 16 has been removed. Body portion 60 further includes opening 66, through which passes viscous material 12. Also shown is slide member 62 with aperture 64 thereon. FIGS. 7 and 8 illustrate the two positions of slide member 62. FIG. 7 shows slide member 62 in an open position, with aperture 64 aligned with opening 66, such that viscous material 12 will be dispensed from container 14. In FIG. 8, slide member 62 is in a closed position, with aperture 64 nonaligned with opening 66, such that viscous material 12 will not be dispensed from container 14.

Having described the invention in detail and by reference to the preferred embodiment thereof, it will be apparent that other modifications and variations are possible without departing from the scope of the invention defined in the appended claims.

What is claimed is:

1. A device for dispensing a viscous material from a container having an outlet on the bottom thereof, comprising:

- a frame having a base adapted to support a container containing a viscous material, a container containing a viscous material having an outlet on the bottom thereof, a pair of side members attached to said base, and a cross member supported by said side members and positioned above the container such that the container is substantially centered beneath said cross member, said cross member having top, bottom, and side portions to define an internal chamber therewithin;
- a seal member having upper and lower major surfaces, said lower surface being in contact with the viscous material in said container along substantially the entire uppermost surface thereof;
- a drive plate in contact with said upper surface of said seal member;
- a drive rod attached to said drive plate and extending vertically through said cross member, said top and bottom portions of said cross member having a pair of vertically aligned apertures to slidably accommodate said drive rod such that said drive rod and said drive plate are vertically translatable within said dispensing device;
- at least one gripping plate positioned within said internal chamber of said cross member and having a bore through which said drive rod extends, said bore being in an off-center position on said gripping plate to provide said gripping plate with an extended contact surface;
- a drive lever pivotally mounted to said cross member and having an actuating member attached thereto, said actuating member contacting said extended contact surface of said gripping plate when said drive lever is pivoted in a downward direction such that said gripping plate locks onto said drive rod and thereby allows said drive lever to forcibly translate said drive rod, drive plate, and seal member in a downward direction against said viscous material in said container to dispense at least a portion of said viscous material from said container via said outlet;
- resilient biasing means for biasing said gripping plate towards said top portion of said cross member such that when said gripping plate unlocks from said drive rod, said gripping plate is translated along said drive rod and pressed against said top portion, thereby pivoting said drive lever in an upward direction; and
- means for positioning said gripping plate, when pressed against said top portion of said cross member, such that said actuating member of said drive lever can be made to contact said extended contact surface of said gripping plate when said drive lever is pivoted in a downward direction, said positioning means allowing said drive rod to be vertically translated in said dispensing device without interference when said gripping plate is pressed against said top portion.

2. The dispensing device of claim 1 wherein said resilient biasing means includes a compression spring positioned within said internal chamber of said cross member, said compression spring being coiled around said drive rod and having a first end in contact with said bottom portion of said cross member and a second end in contact with said gripping plate such that said gripping plate is biased towards said top portion of said cross member.

3. The dispensing device of claim 1 wherein said positioning means includes an angular member positioned within said internal chamber of said cross member and having a bore through which said drive rod extends, said angular member being positioned atop said gripping plate and having a surface canted at a predetermined angle such that, when said gripping plate is pressed against said top portion of said cross member by said resilient biasing means, said angular member causes said gripping plate to be canted at said predetermined angle to allow said actuating member to make contact with said extended contact surface of said gripping plate when said drive lever is pivoted in a downward direction.

4. The dispensing device of claim 1 wherein said extended contact surface of said gripping plate is rectangular shaped.

5. The dispensing device of claim 4 wherein said actuating member of said drive lever is rectangular shaped such that said actuating member contacts said extended contact surface of said gripping plate along a rectangular contact zone.

6. The dispensing device of claim 1 wherein said drive plate is concave on the surface thereof which contacts said upper surface of said seal member.

7. The dispensing device of claim 1 further including a slide valve adapted to be attached to the outlet on the bottom of the container, said slide valve comprising:

- a body portion through which the viscous material dispensed from the container flows, said body portion having an outlet and an inlet to receive the viscous material from the outlet of the container; and
- a slide member positioned between said inlet of said body portion and said outlet thereof, said slide member being translatable between a first position and a second position, said first position preventing the viscous material from being dispensed from the container and said second position allowing the viscous material to be dispensed from the container.

8. The dispersing device of claim 1 further including a dust cover over the top of said container, said dust cover having an opening therein through which said drive rod extends.

9. A device for dispensing a viscous material from a container having an outlet on the bottom thereof, comprising:

a frame having a base adapted to support a container containing a viscous material, a pair of side members attached to said base, and a cross member supported by said side members and adapted to be positioned above the container such that the container will be substantially centered beneath said cross member, said cross member having top, bottom, and side portions to define an internal chamber therewithin;

a seal member having upper and lower surfaces and a drive plate adapted to contact said upper surface of said seal member, said drive plate being concave on the surface thereof which contacts said upper surface of said seal member;

a drive rod attached to said drive plate and extending vertically through said cross member, said top and bottom portions of said cross member having a pair of vertically aligned apertures to slidably accommodate said drive rod such that said drive rod and said drive plate are vertically translatable within said dispensing device;

at least one gripping plate positioned within said internal chamber of said cross member and having a bore through which said drive rod extends, said bore being in an off-center position on said gripping plate to provide said gripping plate with an extended contact surface, said extended contact surface being rectangular in shape;

a drive lever pivotally mounted to said cross member and having a rectangular shaped actuating member attached thereto, said actuating member contacting said extended contact surface of said gripping plate along a rectangular contact zone when said drive lever is pivoted in a downward direction such that said gripping plate locks onto said drive rod and thereby allows said drive lever to forcibly translate said drive rod, drive plate, and seal member in a downward direction so as to push against viscous material in a container to dispense at least a portion of the viscous material from the container via an outlet;

resilient biasing means for biasing said gripping plate towards said top portion of said cross member such that when said gripping plate unlocks from said drive rod, said gripping plate is translated along said drive rod and pressed against said top portion, thereby pivoting said drive lever in an upward direction; and an angular member positioned within said internal chamber of said cross member and having a bore through which said drive rod extends, said angular member being positioned atop said gripping plate and having a surface canted at a predetermined angle such that, when said gripping plate is pressed against said top portion of said cross member by said resilient biasing means, said angular member causes said gripping plate to be canted at said predetermined angle to allow said actuating member to make contact with said extended contact surface of said gripping plate when said drive lever is pivoted in a downward direction, said angular member allowing said drive rod to be vertically translated in said dispensing device without interference when said gripping plate is pressed against said top portion.

10. The dispensing device of claim 9 wherein said resilient biasing means includes a compression spring positioned within said internal chamber of said cross member, said compression spring being coiled around said drive rod and having a first end in contact with said bottom portion of said cross member and a second end in contact with said gripping plate such that said gripping plate is biased towards said top portion of said cross member.

11. The dispensing device of claim 9 wherein said lower surface of said seal member is adapted to be in contact with the viscous material in a container along substantially the entire uppermost surface thereof.

12. The dispensing device of claim 11 further including a container containing a viscous material and having an outlet on the bottom thereof.

13. The dispensing device of claim 12 further including a slide valve adapted to be attached to the outlet on the bottom of the container, said slide valve comprising:

a body portion through which the viscous material dispensed from the container flows, said body portion having an outlet and an inlet to receive the viscous material from the outlet of the container; and a slide member positioned between said inlet of said body portion and said outlet thereof, said slide member being translatable between a first position and a second position, said first position preventing the viscous material from being dispensed from the container and said second position allowing the viscous material to be dispensed from the container.

14. The dispensing device of claim 13 further including a dust cover over the top of said container, said dust cover having an opening therein through which said drive rod extends.

* * * * *